(12) United States Patent
Place et al.

(10) Patent No.: US 11,773,731 B2
(45) Date of Patent: Oct. 3, 2023

(54) BATHTUB DAMPER SEAL ARRANGEMENT FOR GAS TURBINE ENGINE

(71) Applicant: RAYTHEON TECHNOLOGIES CORPORATION, Farmington, CT (US)

(72) Inventors: Emma J. Place, New Hartford, CT (US); Jeffrey Michael Jacques, East Hartford, CT (US); Anthony C. Evans, West Hartford, CT (US); Joshua W. Richards, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/568,358

(22) Filed: Jan. 4, 2022

(65) Prior Publication Data

US 2023/0212950 A1 Jul. 6, 2023

(51) Int. Cl.
*F01D 5/22* (2006.01)
*F01D 5/16* (2006.01)
(Continued)

(52) U.S. Cl.
CPC ............ *F01D 5/22* (2013.01); *F01D 5/16* (2013.01); *F01D 5/187* (2013.01); *F01D 11/006* (2013.01);
(Continued)

(58) Field of Classification Search
CPC . F01D 5/22; F01D 5/16; F01D 11/006; F05D 2240/80; F05D 2260/96
See application file for complete search history.

(56) References Cited

U.S. PATENT DOCUMENTS

| 4,457,668 A | * | 7/1984 | Hallinger | ............... F01D 5/26 416/193 A |
| 5,785,499 A | | 7/1998 | Houston et al. | |

(Continued)

FOREIGN PATENT DOCUMENTS

| EP | 3832072 | 6/2021 |
| FR | 2963382 | 2/2012 |

OTHER PUBLICATIONS

European Search Report for European Patent Application No. 23150318.6 dated May 19, 2023.

*Primary Examiner* — Eldon T Brockman
(74) *Attorney, Agent, or Firm* — Carlson, Gaskey & Olds, P.C.

(57) ABSTRACT

A damper seal for a gas turbine engine includes a damper body extending in a first direction between a leading edge portion and a trailing edge portion, extending in a second direction between first and second sidewalls, and extending in a third direction between a convex outer damper face and a concave inner damper face. The inner damper face establishes a damper pocket. The leading and trailing edge portions slope inwardly from opposite ends of the damper body to bound the damper pocket in the first direction. The first and second sidewalls extend from the leading edge portion to the trailing edge portion and slope inwardly from opposite sides of the damper body to bound the damper pocket in the second direction. The outer damper face is pre-formed according to a first predetermined geometry that substantially corresponds to a second predetermined geometry of a platform undersurface bounding a neck pocket of an airfoil. A method of damping for a gas turbine engine is also disclosed.

20 Claims, 8 Drawing Sheets

(51) Int. Cl.
*F01D 5/18* (2006.01)
*F01D 11/00* (2006.01)

(52) U.S. Cl.
CPC ...... *F05D 2240/55* (2013.01); *F05D 2240/80* (2013.01); *F05D 2250/711* (2013.01); *F05D 2250/712* (2013.01); *F05D 2260/20* (2013.01); *F05D 2260/96* (2013.01)

(56) References Cited

U.S. PATENT DOCUMENTS

| | | | |
|---|---|---|---|
| 7,214,034 B2* | 5/2007 | Giot | F01D 5/3015 |
| | | | 416/193 A |
| 9,863,263 B2* | 1/2018 | Berche | F01D 11/008 |
| 9,951,625 B2 | 4/2018 | Congratel et al. | |
| 10,113,434 B2 | 10/2018 | Snyder et al. | |
| 10,125,615 B2* | 11/2018 | Congratel | F01D 5/22 |
| 10,662,784 B2 | 5/2020 | Thistle et al. | |
| 11,377,967 B2* | 7/2022 | Skidelsky | F01D 11/006 |
| 2005/0175463 A1* | 8/2005 | Giot | F01D 11/008 |
| | | | 416/224 |
| 2013/0108467 A1* | 5/2013 | Berche | F01D 11/008 |
| | | | 416/96 R |
| 2015/0322796 A1 | 11/2015 | Roussely-Rousseau et al. | |
| 2016/0123153 A1 | 5/2016 | Congratel et al. | |
| 2021/0172324 A1* | 6/2021 | Skidelsky | F01D 5/22 |

* cited by examiner

BATHTUB DAMPER SEAL ARRANGEMENT FOR GAS TURBINE ENGINE

BACKGROUND

This disclosure relates to damping of gas turbine engine components.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The blades, vanes and arc segments are exposed to relatively hot gases in the gas flow path. The components may be subject to vibration during engine operation. Damper seals may be positioned between the adjacent blades, vanes and arc segments to seal intersegment gaps adjacent the gas flow path and provide damping of the components.

SUMMARY

A damper seal for a gas turbine engine according to an example of the present disclosure includes a damper body extending in a first direction between a leading edge portion and a trailing edge portion, extending in a second direction between first and second sidewalls, and extending in a third direction between a convex outer damper face and a concave inner damper face. The inner damper face establishes a damper pocket. The leading and trailing edge portions slope inwardly from opposite ends of the damper body to bound the damper pocket in the first direction. The first and second sidewalls extend from the leading edge portion to the trailing edge portion and slope inwardly from opposite sides of the damper body to bound the damper pocket in the second direction. The outer damper face is pre-formed according to a first predetermined geometry that substantially corresponds to a second predetermined geometry of a platform undersurface bounding a neck pocket of an airfoil.

In a further embodiment of any of the foregoing embodiments, the damper body is moveable in the third direction to establish a sealing relationship between the platform undersurface and the outer damper face in a hot assembly state.

In a further embodiment of any of the foregoing embodiments, the inner damper face is concave across a width of the damper pocket for substantially all positions along a length of the damper pocket from the leading edge portion to the trailing edge portion.

In a further embodiment of any of the foregoing embodiments, a minimum width is established between the first and second sidewalls in the second direction, a minimum thickness is established between the outer damper face and the inner damper face in the third direction at a position along the minimum width, a thickness ratio is defined as the minimum thickness divided by the minimum width, and the thickness ratio is greater than or equal to 0.10.

In a further embodiment of any of the foregoing embodiments, a width ratio is defined as a minimum width of the damper pocket in the second direction divided by a maximum length of the damper pocket in the first direction, and the width ratio is less than or equal to 0.25. A first width of the damper pocket is established across the leading edge portion, a second width of the damper pocket is established across the trailing edge portion, and the first and second widths are greater than the minimum width.

In a further embodiment of any of the foregoing embodiments, the outer damper face follows a ridge of the damper body in the first direction from the leading edge portion to the trailing edge portion, the ridge has a first peak and a second peak, the first peak is adjacent to the leading edge portion, the second peak is adjacent to the trailing edge portion, the outer damper face slopes inwardly from the first peak to the second peak such that the first peak is outward of the second peak relative to the third direction.

In a further embodiment of any of the foregoing embodiments, the leading and trailing edge portions are dimensioned to sit on respective shelves opposing the platform undersurface of the airfoil and the first and second sidewalls are dimensioned to span between the shelves in a cold assembly state.

In a further embodiment of any of the foregoing embodiments, a locating tab extends in the third direction from the trailing edge portion of the damper body. The locating tab is dimensioned to abut one of the shelves to limit movement of the damper body in the second direction.

In a further embodiment of any of the foregoing embodiments, the airfoil is a turbine blade.

A gas turbine engine according to an example of the present disclosure includes an array of blades rotatable about an engine axis, an array of vanes adjacent to the array of blades, and an array of blade outer air seals distributed about the array of blades to bound a gas path. Each of the blades includes an airfoil section extending in a radial direction from a platform section, extending in a chordwise direction between leading and trailing edges, and extending in a circumferential direction between pressure and suction sides. Each of the blades includes a neck section extending in the radial direction between the platform section and a root section, the root section mounted to a rotatable disk. The platform section extends in the circumferential direction between mate faces and extends in the radial direction between a platform undersurface and a gas path surface bounding the gas path. The platform undersurface is dimensioned according to a first predetermined geometry. The mate faces of adjacent blades of the array of blades face each other to establish an intersegment gap. The neck sections of the adjacent blades oppose each other in the circumferential direction to establish a neck cavity bounded in the radial direction by the platform undersurfaces of the adjacent blades. An array of damper seals span across the respective intersegment gaps. Each of the damper seals includes a damper body having an outer damper face and an inner damper face establishing an elongated damper pocket. The outer damper face is pre-formed according to a second predetermined geometry that substantially corresponds to the first predetermined geometry of the adjacent blades such that at least a majority of the surfaces of the outer damper face establish contact with the platform undersurfaces of the adjacent blades in a hot assembly state, but is spaced apart from the platform undersurfaces of the adjacent blades to establish a clearance gap in a cold assembly state.

In a further embodiment of any of the foregoing embodiments, each of the blades includes first and second shelves that extend in the circumferential direction from the neck section to establish a neck pocket of the neck cavity. The neck pocket extends in the radial direction between the platform undersurface and the first and second shelves. A leading edge portion of the respective damper seal sits on the first shelves of the adjacent blades and a trailing edge portion of the respective damper seal sits on the second shelves of the adjacent blades to establish the clearance gap.

In a further embodiment of any of the foregoing embodiments, each of the dampers includes a locating tab extending in the radial direction from one of the leading and trailing edge portions. The locating tab is trapped between opposed sidewalls of the second shelves of the adjacent blades.

In a further embodiment of any of the foregoing embodiments, the damper body is rotatable about an axis extending in the axial direction in response to relative radial movement between the mate faces of the adjacent blades in the hot assembly state.

In a further embodiment of any of the foregoing embodiments, first and second sidewalls of the damper body follow a length of the damper body from the leading edge portion to the trailing edge portion.

In a further embodiment of any of the foregoing embodiments, the first and second sidewalls are dimensioned to follow a contour of the respective neck sections of the adjacent blades. A minimum width is established between the first and second sidewalls of the damper body in the circumferential direction, a minimum thickness is established between the outer damper face and the inner damper face in the radial direction at a position along the minimum width, a thickness ratio is defined as the minimum thickness divided by the minimum width, and the thickness ratio is greater than or equal to 0.10.

In a further embodiment of any of the foregoing embodiments, the platform undersurfaces of the adjacent blades establish a concavity across a width the neck cavity at substantially all positions along a length of the neck cavity in which the outer damper face abuts against the platform undersurfaces in the hot assembly state.

In a further embodiment of any of the foregoing embodiments, the inner damper face is dimensioned to surround the damper pocket in the axial and circumferential directions. A width ratio is defined as a minimum width of the damper pocket in the circumferential direction divided by a maximum length of the damper pocket in the axial direction, and the width ratio is less than or equal to 0.25. A first width of the damper pocket is established across the leading edge portion, a second width of the damper pocket is established across the trailing edge portion, and the first and second widths are greater than the minimum width.

A method of damping for a gas turbine engine according to an example of the present disclosure includes moving adjacent airfoils in a circumferential direction relative to each other to trap a damper seal in opposed neck pockets of the adjacent airfoils to establish a cold assembly state. The adjacent airfoils include respective platform sections, opposed mate faces of the platform sections establish an intersegment gap, and the damper seal circumferentially spans across the intersegment gap in the cold assembly state. Platform undersurfaces of the platform sections bound the respective neck pockets in the radial direction, and the platform undersurfaces are dimensioned according to a first predetermined geometry. The damper seal includes a damper body having an outer damper face and an inner damper face establishing a concave damper pocket. The outer damper face is pre-formed according to a second predetermined geometry substantially corresponding to the first predetermined geometry such that at least a majority of the surfaces outer damper face establish a sealing relationship with the platform undersurfaces of the adjacent airfoils in a hot assembly state, but the outer damper face is spaced apart from the platform undersurfaces in a cold assembly state.

In a further embodiment of any of the foregoing embodiments, each of the adjacent airfoils includes first and second shelves that extend in the circumferential direction to bound the respective neck pockets in the radial direction. The step of moving the adjacent airfoils occurs such that a leading edge portion of the damper seal sits on the first shelves of the adjacent airfoils and a trailing edge portion of the damper seal sits on the second shelves of the adjacent airfoils in the cold assembly state.

In a further embodiment of any of the foregoing embodiments, the method includes securing the adjacent airfoils to a rotatable disk. Each of the adjacent airfoils includes a first material, and the disk includes a second material that differs from the first material. The method includes rotating the disk to establish contact between the outer damper face and the platform undersurfaces to seal the intersegment gap. The method includes conveying cooling flow from a coolant source to the neck pockets.

The present disclosure may include any one or more of the individual features disclosed above and/or below alone or in any combination thereof.

The various features and advantages of this invention will become apparent to those skilled in the art from the following detailed description of an embodiment. The drawings that accompany the detailed description can be briefly described as follows.

DETAILED DESCRIPTION

Figure 1:
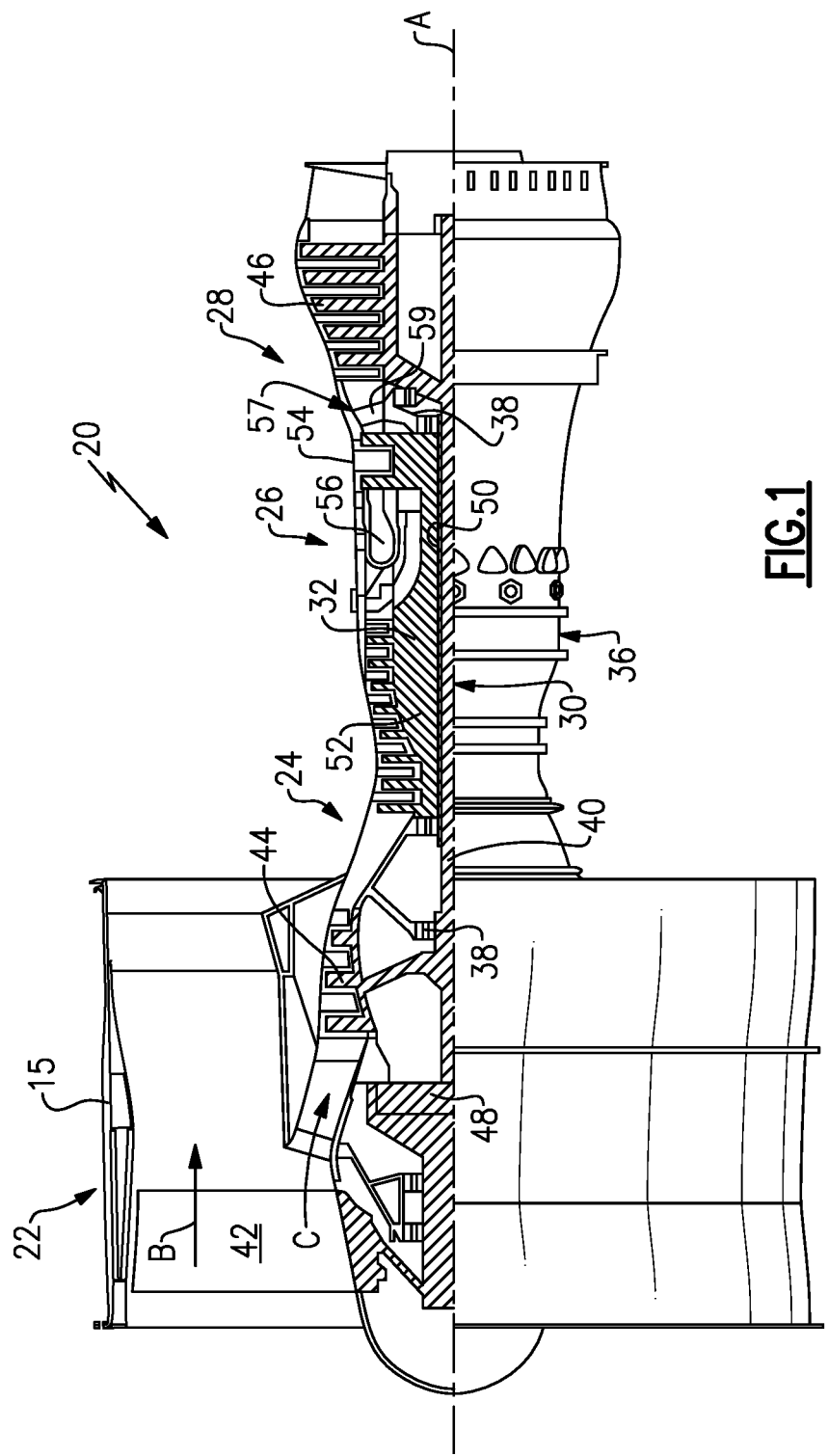
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
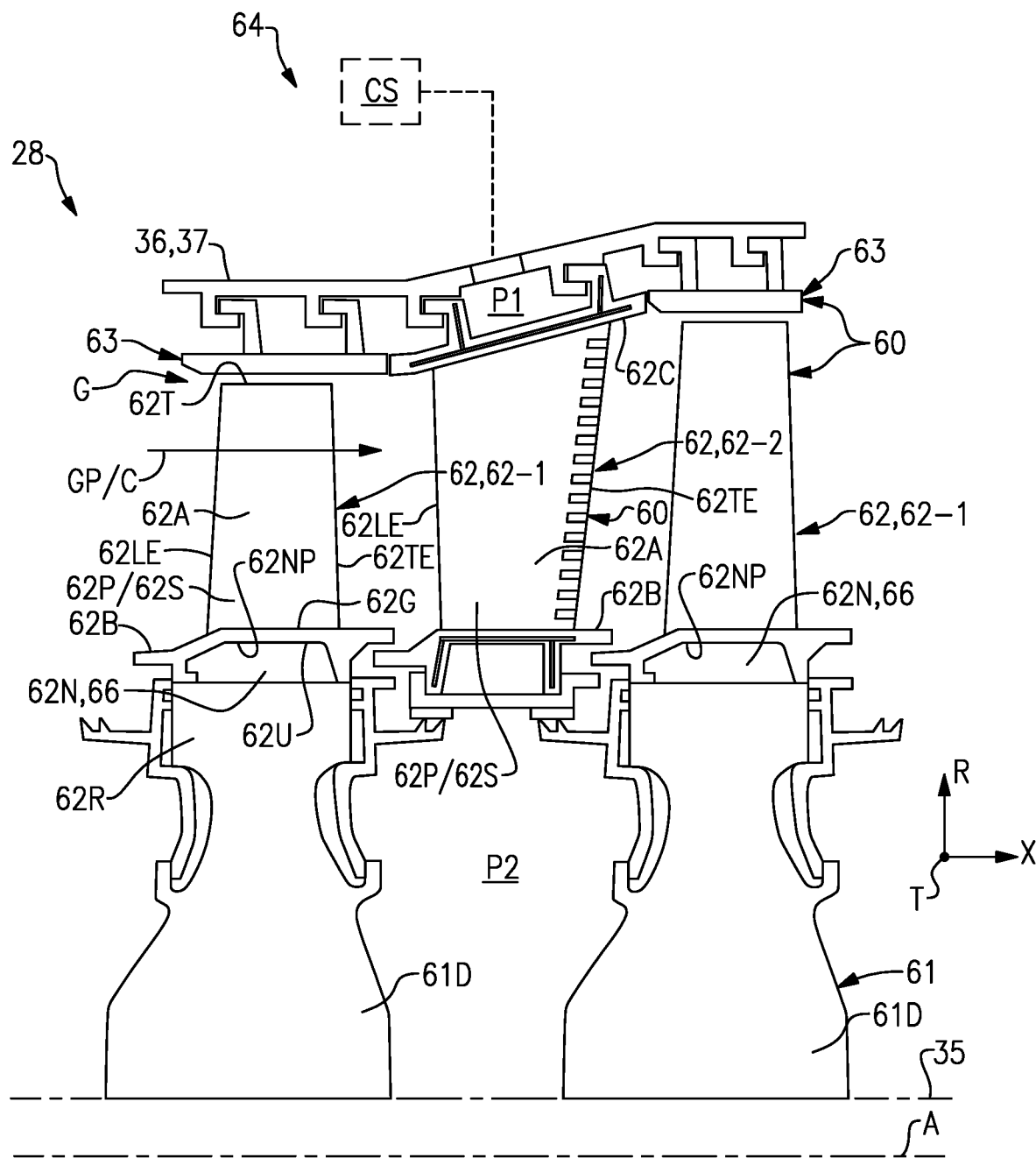
FIG. 2 shows an airfoil arrangement for a turbine section.

FIG. 2 illustrates an exemplary section of a gas turbine engine, such as the turbine section 28 of FIG. 1. The turbine section 28 includes a plurality of components 60 arranged relative to the engine axis A, including a rotor 61, one or more airfoils 62, and one or more blade outer air seals (BOAS) 63. Example airfoils 62 include rotatable blades 62-1 and static vanes 62-2. The rotor 61 can include one or more rotatable disks 61D. Each disk 61D and/or another portion of the rotor 61 is coupled to a rotatable shaft 35 (shown in dashed lines for illustrative purposes). The shaft 35 can be one of the shafts 40, 50 of FIG. 1, for example. Each of the disks 61D of the rotor 61 carries one or more blades 62-1 that are rotatable about the engine axis A in a gas path GP, such as the core flow path C.

Each airfoil 62 includes an airfoil section 62A extending in a spanwise or radial direction R from a first (e.g., inner) platform section 62B. Each blade 62-1 extends in the radial direction R from the platform section 62B to a tip portion 62T. Each vane 62-2 extends in the radial direction R from the first platform section 62B to a second (e.g., outer) platform section 62C. The platform sections 62B, 62C can serve as end walls that bound or define a respective portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE to establish an aerodynamic surface contour of the airfoil 62. The root section 62R of the blade 62-1 can be mounted to, or can be integrally formed with, the rotor 61. The vane 62-2 can be arranged to direct or guide flow in the gas path GP from and/or towards the adjacent blade(s) 62-1.

Each BOAS 63 can be spaced radially outward from the tip portion 62T of the blade 62-1. The BOAS 63 can be continuous or can be segmented to include an array of seal arc segments that are circumferentially distributed or arranged in an annulus about the engine axis A and about an array of the blades 62-1 to bound the gas path GP.

The turbine section 28 can include at least one array of airfoils 62, including at least one array of blades 62-1 and at least one array of vanes 62-2, and can include at least one array of BOAS 63 arranged circumferentially about the engine axis A. The array of vanes 62-2 are adjacent to and spaced axially from the array of blades 62-1 relative to the engine axis A. The tip portions 62T of the blades 62-1 and adjacent BOAS 63 are arranged in close radial proximity to reduce the amount of gas flow that escapes around the tip portions 62T through a corresponding clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold assembly state or condition, a cruise condition and/or a takeoff condition.

The turbine section 28 includes a cooling arrangement 64 for providing cooling augmentation to the components 60 during engine operation. The cooling arrangement 64 can include one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more coolant sources CS (one shown) are configured to provide cooling air to the plenums P1, P2. The plenums P1, P2 are configured to receive pressurized cooling flow from the coolant source(s) CS to cool portions of the components 60 including the airfoils 62 and/or BOAS 63. Coolant sources CS can include bleed air from an upstream stage of the compressor section 24 (FIG. 1), bypass air, or a secondary cooling system aboard the aircraft, for example. Each of the plenums P1, P2 can extend in the circumferential direction T between adjacent airfoils 62 and/or BOAS 63.

Each component 60 can be formed of a material having a high temperature capability, including metallic and/or non-metallic materials. Example metallic materials include metals and alloys, such as nickel-based superalloys. Example non-metallic materials include ceramic-based materials such as monolithic ceramics and ceramic matrix composites (CMC). Monolithic ceramics can include silicon carbide (SiC) and silicon nitride ($Si_3N_4$) materials.

Figure 4:
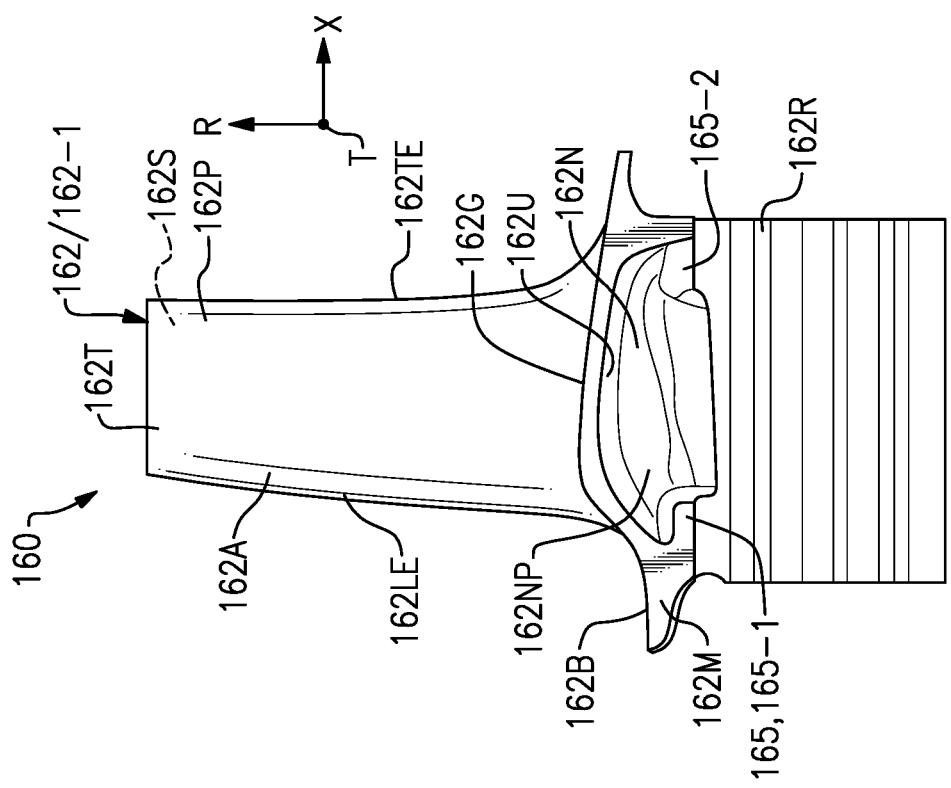
FIG. 4 illustrates a side view of the airfoil of FIG. 3.
Figure 3:
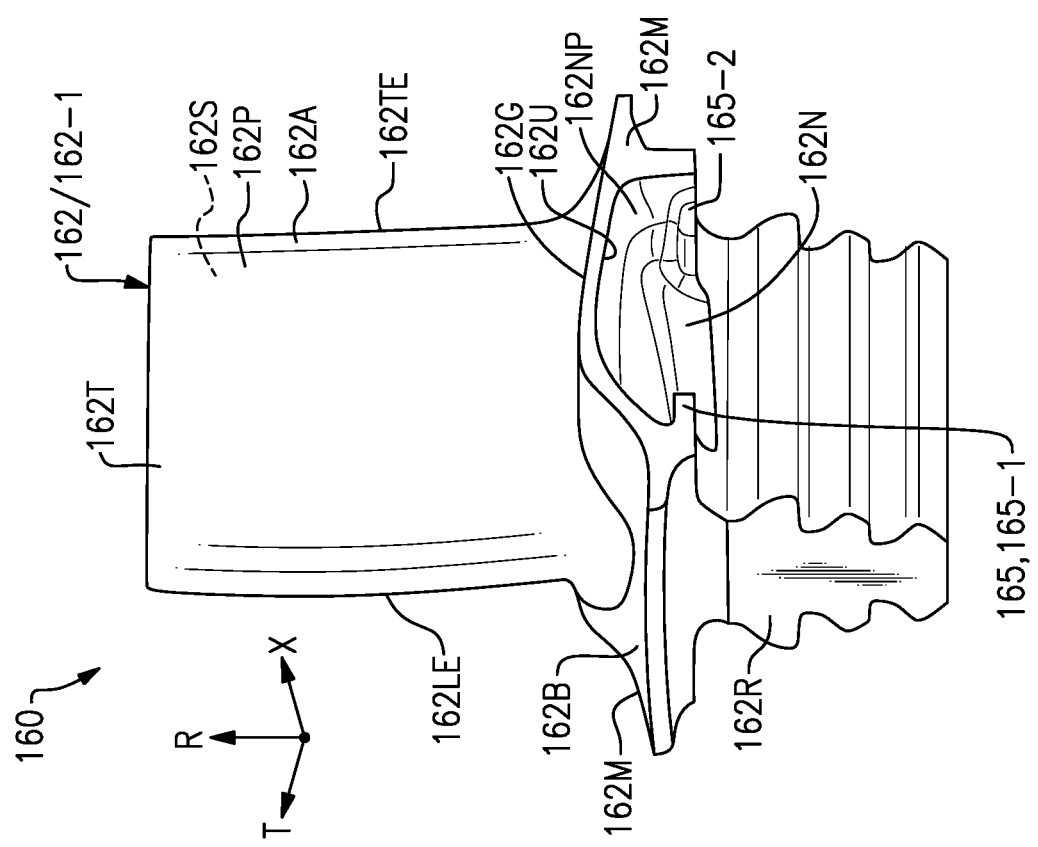
FIG. 3 illustrates a perspective view of an exemplary airfoil.

FIGS. 3-4 illustrate an exemplary component 160 for a gas turbine engine. In this disclosure, like reference numerals designate like elements where appropriate and reference numerals with the addition of one-hundred or multiples thereof designate modified elements that are understood to incorporate the same features and benefits of the corresponding original elements. In the illustrative example of FIGS. 3-4, the component 160 is an airfoil 162 such as a blade 162-1. The blade 162-1 can be a rotatable turbine blade incorporated into the turbine section 28. Other components of the engine 20 can be benefit from the teachings disclosed herein, including the vanes 62-2 and BOAS 63 of FIG. 2.

The airfoil 162 includes an airfoil section 162A extending in a spanwise or radial direction R from a platform section 162B. The airfoil section 162A extends in an axial or chordwise direction X between leading and trailing edges 162LE, 162TE. The airfoil section 162A extends in a circumferential or thickness direction T between pressure and suction sides 162P, 162S. The airfoil 162 includes a neck section 162N extending in the radial direction R between the platform section 162B and a root section 162R (see also FIG. 2). The root section 162R can be mounted to or otherwise carried to a rotatable disk, such as one of the disks 61D of FIG. 2.

Figure 8:
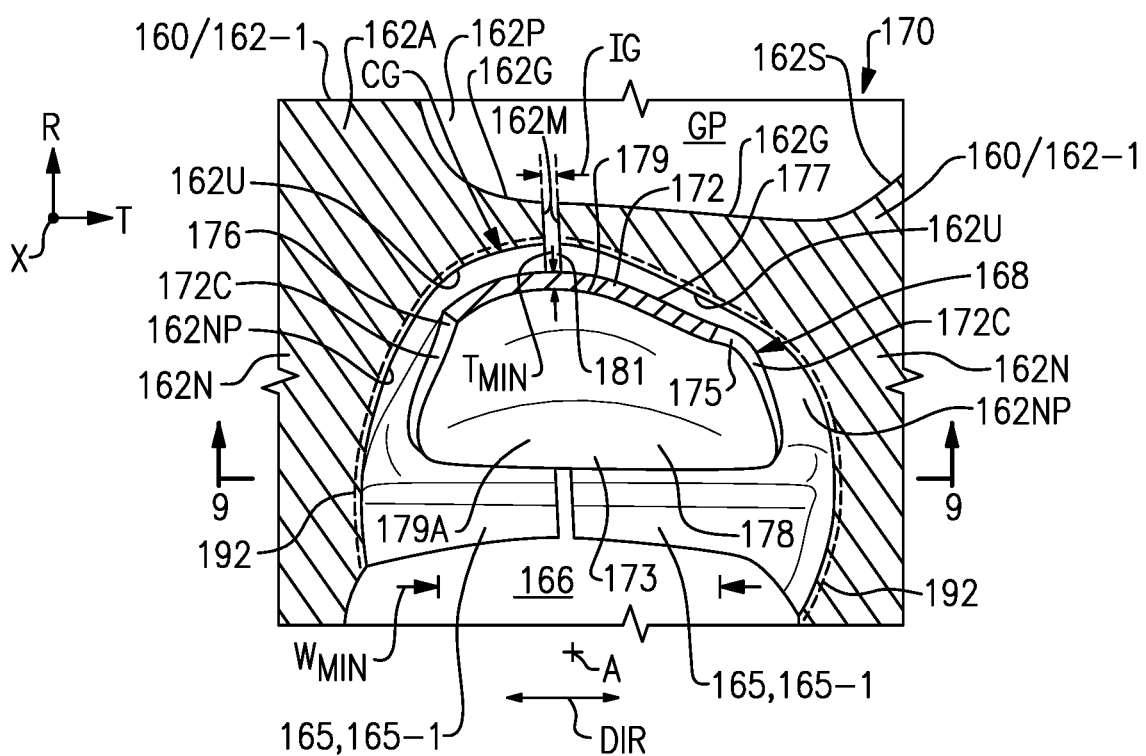
FIG. 8 illustrates a sectional view of the assembly of FIG. 7 including the damper seal positioned between adjacent airfoils.

The platform section 162B extends in the circumferential direction T between a pair of mate faces 162M. The platform section 162B extends in the radial direction R between a platform undersurface (e.g., cold side surface) 162U and a gas path surface 162G bounding a gas path, such as the gas path GP of FIG. 2. The platform undersurface 162U can be dimensioned according to a (e.g., first) predetermined geometry. The platform undersurface 162U can be dimensioned to bound a neck pocket 162NP of the airfoil 162. The neck pocket 162NP can establish a portion of a neck cavity 166, as illustrated in FIG. 8 (see also FIG. 2). One or more coatings 192 can be deposited along the platform undersurface 162U (shown in dashed lines in FIG. 8 for illustrative purposes). The coating 192 may serve to reduce corrosion and cracking along the platform undersurfaces 162U that may otherwise be caused by exposure to the hot combustion gases in the gas path GP.

The airfoil 162 can include one or more shelves 165 extending circumferentially outward from each side of the neck portion 162NP. In implementations, the shelves 165 include first and second shelves 165-1, 165-2 extending axially towards each other from the platform section 162B to bound the neck pocket 162NP. The shelves 165-1, 165-2 can be dimensioned to oppose the platform undersurface 162U of the airfoil 162 in the radial direction R.

Figure 9:
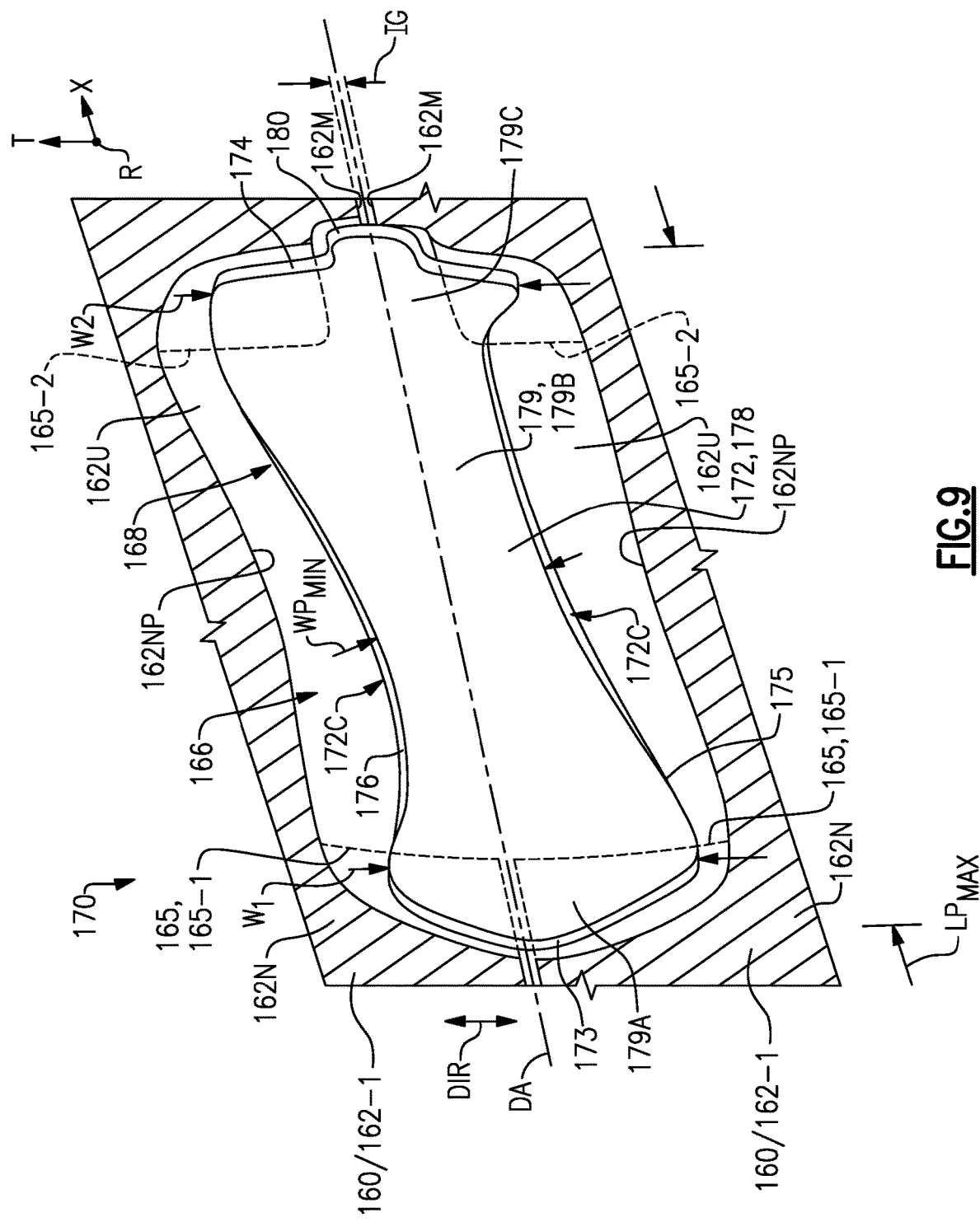
FIG. 9 illustrates a sectional view of the assembly taken along line 9-9 of FIG. 8.

Referring to FIGS. 8-9, with continuing reference to FIGS. 3-4, the mate faces 162M of adjacent blades 162-1 of an array of blades 162 can be arranged to face or oppose each other to establish an intersegment gap IG. The neck sections 162N of the adjacent blades 162-1 can be arranged to oppose each other in the circumferential direction T to establish and circumferentially bound the neck cavity 166. The neck cavity 166 can be bounded in the radial direction R by the platform undersurfaces 162U of the adjacent blades 162-1. The shelves 165 can extend circumferentially to the adjacent mate face 162M, as illustrated by the first shelf 165-1, and/or can be spaced apart from the adjacent mate face 162M in the circumferential direction T, as illustrated by the second shelf 165-2. The shelves 165 are shown in dashed lines in FIG. 9 for illustrative purposes. The first and second shelves 165-1, 165-2 can be dimensioned to extend in the circumferential direction T from the neck section 162N to establish a respective neck pocket 162NP of the neck cavity 166. The neck pocket 162NP can extend in the radial direction R between the platform undersurface 162U and the first and second shelves 165-1, 165-2.

The blades 162 can be subject to hot gases communicated along the gas path GP during engine operation. The intersegment gap IG can be sealed to reduce a likelihood of ingestion of the hot gases into the neck cavity 166 during engine operation.

Figure 5:
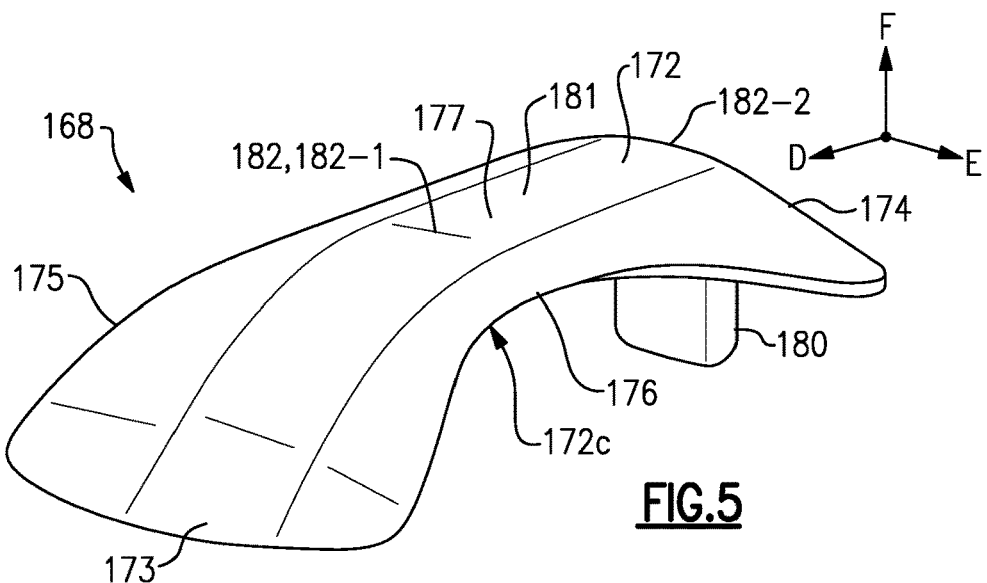
FIG. 5 illustrates an isolated perspective view of a damper seal.
Figure 6A:
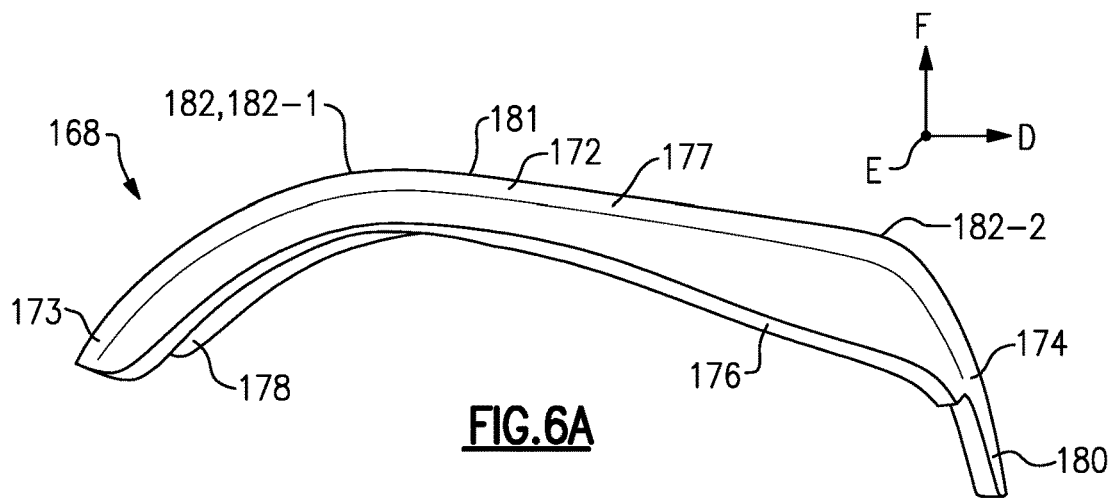
FIG. 6A illustrates a side view of the damper seal of FIG. 5.
Figure 6B:
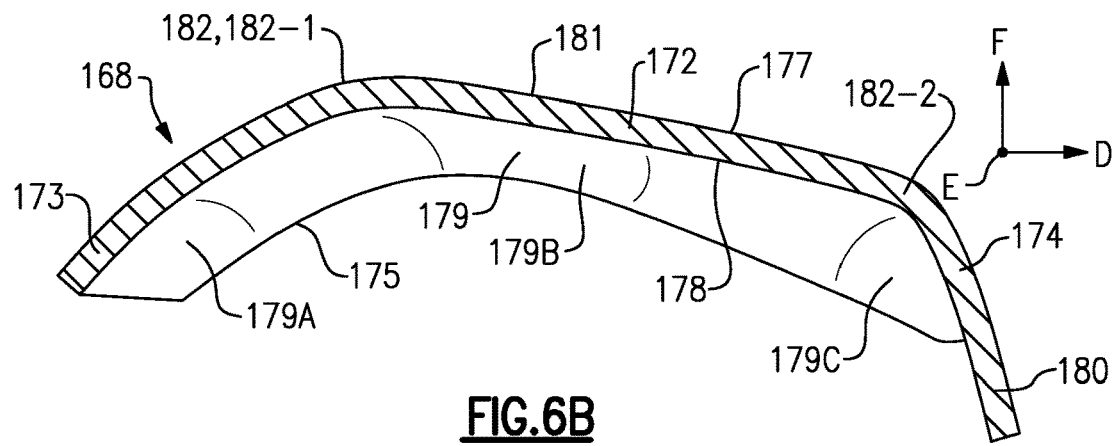
FIG. 6B illustrates a sectional view of the damper seal of FIG. 5.
Figure 7:
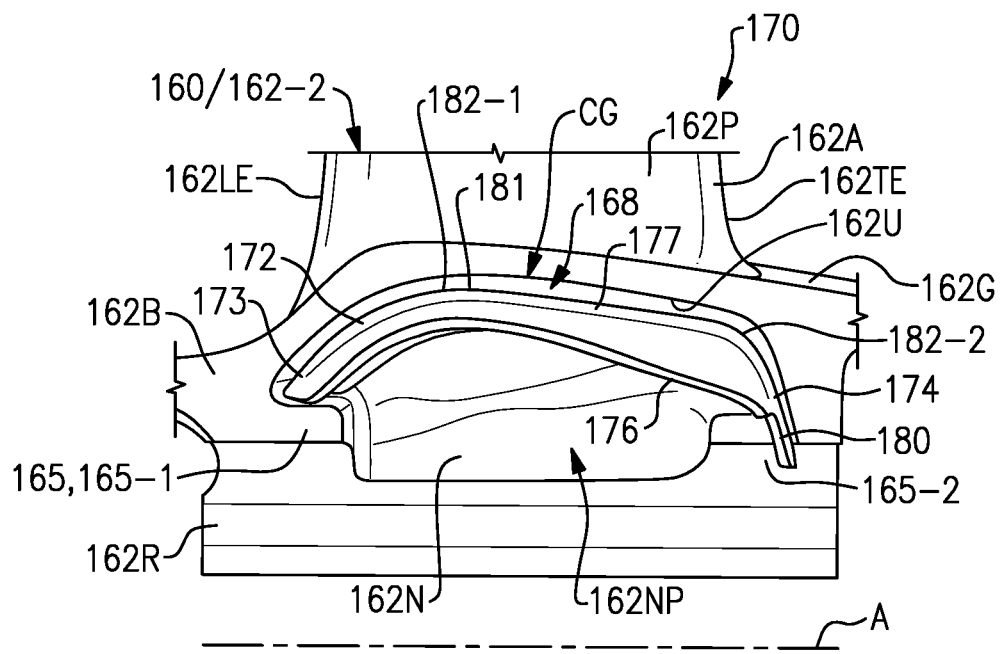
FIG. 7 illustrates a side view of an assembly including the damper seal of FIG. 6A positioned relative to the airfoil of FIG. 4 in a cold assembly state.

Referring to FIGS. 5 and 6A-6B, with continuing reference to FIGS. 3-4, a damper seal 168 for a gas turbine engine is disclosed. The damper seal 168 can be positioned relative to one or more airfoils to establish an assembly 170, as illustrated in FIGS. 7-9. The damper seal 168 be incorporated into the turbine section 28 or another portion of the engine 20. Other portions of the engine 20 can benefit from the teachings disclosed herein, including airfoils and end walls in the compressor section 24, combustor panels or liners defining portions of a combustion chamber in the combustor section 26, exhaust nozzles, and other portions of the engine 20 that may be subject to vibration and/or elevated temperature conditions during engine operation.

Other systems can also benefit from the teachings disclosed herein, including engines lacking a fan for propulsion.

The assembly 170 includes an array of airfoils 162, as illustrated by the adjacent blades 162-1 of FIGS. 8-9. The damper seal 168 is dimensioned to be received in the neck pockets 162NP of adjacent airfoils 162, such as the blades 162-1. The damper seal 168 is dimensioned to establish a sealing relationship with the airfoils 162 adjacent to the intersegment gap IG, as illustrated in FIG. 8. The assembly 170 can include an array of damper seals 168 that span across respective intersegment gaps IG established between adjacent pairs of the airfoils 162.

The damper seal 168 includes an elongated main or damper body 172 extending in a first direction D between a leading edge (e.g., first or forward) portion 173 and a trailing edge (e.g, second or aft) portion 174. The damper body 172 extends in a second direction E between first and second sidewalls 175, 176. The damper body 172 extends in a third direction F between an outer damper face 177 and an inner damper face 178 (see FIGS. 6B and 8-9). The damper body 172 can be contoured such that the outer damper face 177 is generally convex across a width of the damper body 172 between the sidewalls 175, 176 and such that the inner damper face 178 is generally concave across the width of the damper body 172.

The damper seal 168 can be arranged at various orientations relative to the adjacent airfoils 162. The first, second and third directions D, E, F can correspond to the axial, circumferential and radial directions A, T, R, respectively, when the damper seal 168 is positioned in the assembly 170. It should be understood that arrangement of the damper seal 168 in FIGS. 7-9 is exemplary and that the damper seal 168 can be arranged at any orientation relative to the engine axis A in accordance with the teachings disclosed herein.

The damper body 172 of the damper seal 168 can have a generally elongated, "bathtub" shaped geometry. The bathtub shaped geometry of the damper body 172 can improve rigidity or stiffness of the damper seal 168. The inner damper face 178 can establish a damper pocket 179, as illustrated by FIGS. 8-9. The inner damper face 178 of the damper body 172 can be contoured or otherwise dimensioned to substantially or completely surround a perimeter of the damper pocket 179 in the first and second directions D, E (e.g., axial and circumferential directions X, T). The perimeter of the damper pocket 179 can establish an opening that faces in the third direction F. The opening of the damper pocket 179 can face radially inward relative to the radial direction R of the assembly 170. For the purposes of this disclosure, the term "substantially" means within 95% of the stated value or relationship unless otherwise indicated. The leading edge portion 173 and trailing edge portion 174 can be dimensioned to slope inwardly from opposite ends of the damper body 172 to bound the damper pocket 179 in the first direction D, as illustrated in FIG. 6B.

The damper body 172 and damper pocket 179 can have a generally arch-shaped profile along a length of the damper body 172, as illustrated in FIGS. 6A-6B. The first sidewall 175 and second sidewall 176 can extend from the leading edge portion 173 to the trailing edge portion 174 and can slope inwardly from opposite sides of the damper body 172 to bound the damper pocket 179 in the second direction E. The damper pocket 179 can include a first (e.g., leading edge) region 179A, a second (e.g., intermediate) region 179B and a third (e.g., trailing edge) region 179C. The second region 179B can interconnect the first region 179A and third region 179C. The first region 179A can follow a contour of the inner damper face 178 along the leading edge portion 173 of the damper seal 168. The third region 179C can follow a contour of the inner damper face 178 along the trailing edge portion 174. The inner damper face 178 can be contoured such that each of the regions 179A, 179B, 179C has a generally concave geometry across the width of the damper seal 168. A length of each of the first and third regions 179A, 179C can have a major component in the third direction F. A length of the second region 179B can have a major component in the first direction D such that the first and third regions 179A, 179C extend transversely from the second region 179B to follow the inner damper face 178.

The outer damper face 177 can be dimensioned to follow a ridge 181 of the damper body 172 in the first direction D from the leading edge portion 173 to the trailing edge portion 174. The ridge 181 can have one or more inflections or peaks 182. In the example of FIGS. 3-4, the ridge 181 has a first peak 182-1 and a second peak 182-2. The first peak 182-1 can be adjacent to the leading edge portion 173. The second peak 182-2 can be adjacent to the trailing edge portion 174. The damper body 172 can be dimensioned such that the outer damper face 177 slopes inwardly from the first peak 182-1 to the second peak 182-2. The first peak 182-1 can be outward of the second peak 182-2 relative to the third direction F, or vice versa.

Referring to FIG. 7, with continuing reference to FIGS. 5 and 6A-6B, the leading edge portion 173 and trailing edge portion 174 of the damper seal 168 can be dimensioned to sit on the shelves 165-1, 165-2 opposing the platform undersurface 162U of the airfoil 162 in a cold assembly state. The first sidewall 175 and/or second sidewall 176 can be dimensioned to span between the shelves 165-1, 165-2 in the cold assembly state. The first sidewall 175 and/or second sidewall 176 of the damper body 172 can be dimensioned to follow a length of the damper body 172 from the leading edge portion 173 to the trailing edge portion 174. The circumferential edge faces of the first and second sidewalls 175, 176 can be dimensioned to follow a contour of, but can be spaced apart from, the respective neck sections 162N of the adjacent blades 162-1, as illustrated in FIG. 8 (see also FIG. 11).

The damper seal 168 can include at least one locating tab 180 for positioning the damper seal 168 in the assembly 170. The locating tab 180 can be dimensioned to extend in the third direction F from the trailing edge portion 174 of the damper body 172. In other examples, the locating tab 180 can be dimensioned to extend from the leading edge portion 173 of the damper body 172. The locating tab 180 can be dimensioned to extend in the radial direction R from one of the leading and trailing edge portions 173, 174, such as the trailing edge portion 174. The locating tab 180 can be dimensioned to abut one or more of the shelves 165, such as the second shelf 165-2, to limit movement of the damper body 172 in the second direction E. The locating tab 180 can be trapped between opposed sidewalls of the second shelves 165-2 of the adjacent blades 162-1 to limit movement of the damper body in the circumferential direction T, as illustrated in FIG. 9. The locating tab 180 can provide a mistake proofing feature that limits a likelihood that the damper seal 168 is installed in the wrong orientation.

Referring to FIGS. 7-8, with continuing reference to FIGS. 5 and 6A-6B, the damper seal 168 can be pre-formed to have a geometry that substantially corresponds to a geometry of the neck pocket 162NP established by surfaces of the platform undersurface 162U opposing the outer damper face 177 of the damper seal 168 in a cold assembly state. The outer damper face 177 can be pre-formed according to a (e.g., second) predetermined geometry. The predetermined geometry of the outer damper face 177 can substantially correspond to the predetermined geometry of the platform undersurface 162U bounding the neck pocket 162NP of each of the airfoils 162 (see also platform undersurfaces 162U' and outer damper face 177' of FIGS. 10-11).

Figure 10:
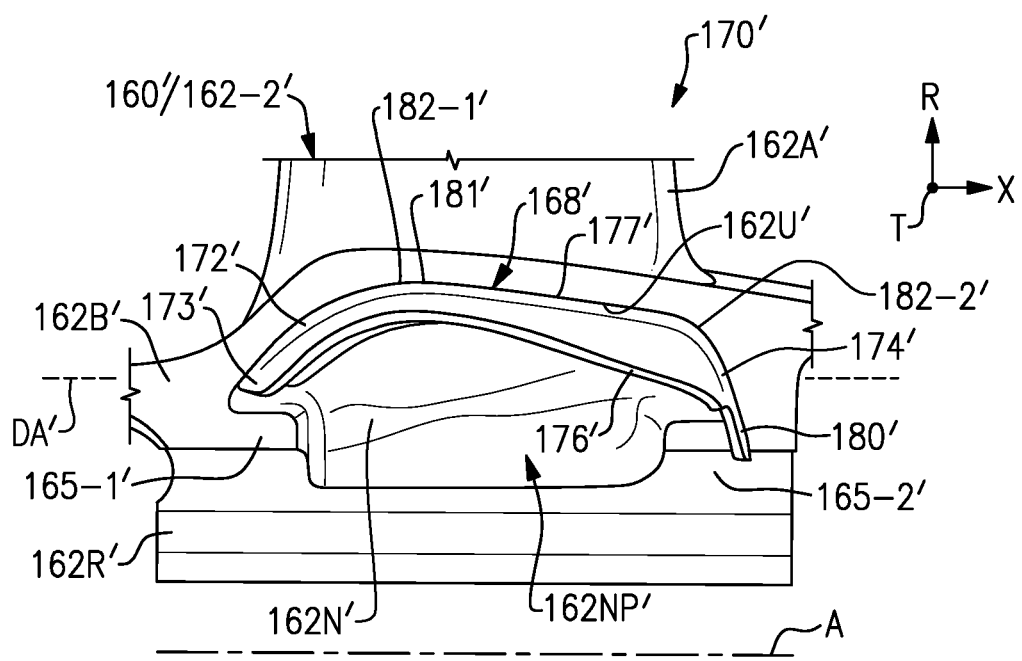
FIG. 10 illustrates the assembly of FIG. 7 in a hot assembly state.
Figure 11:
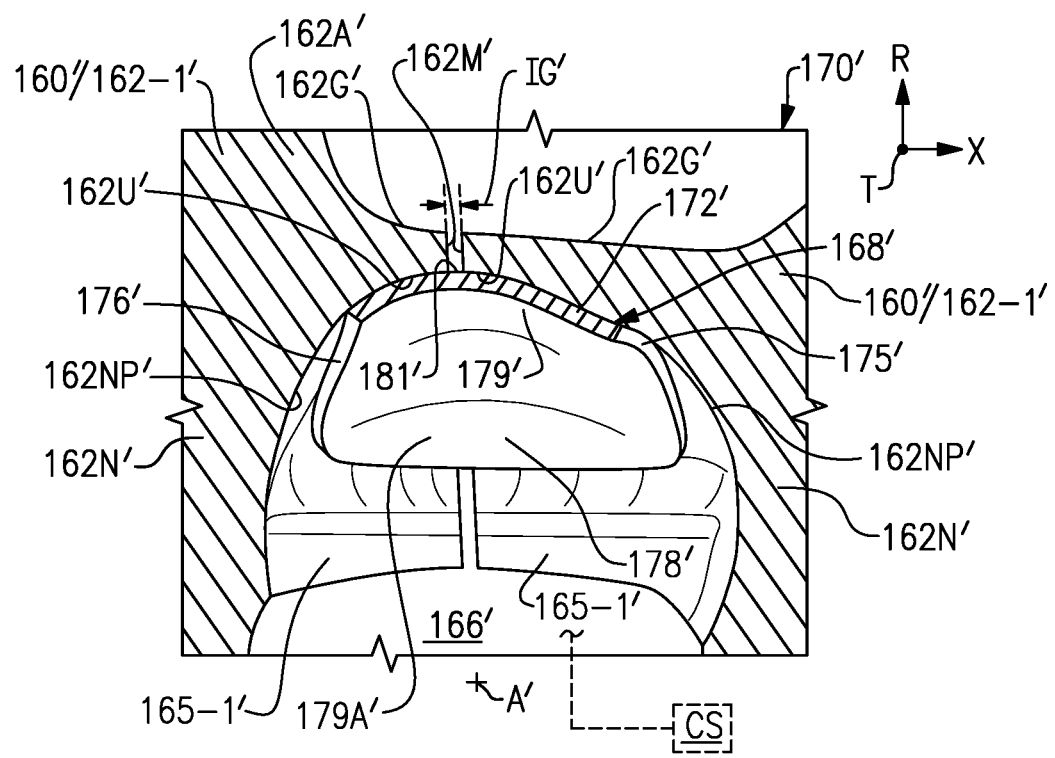
FIG. 11 illustrates the assembly of FIG. 8 in the hot assembly state.

The outer damper face 177 can be pre-formed according to the predetermined geometry that substantially or completely corresponds to the predetermined geometry of the adjacent blades 162-1 such that at least a majority or substantially all of the surfaces of the outer damper face 177 establish contact with the platform undersurfaces 162U of the adjacent blades 162-1 in a hot assembly state, as illustrated by the outer damper face 177' of FIGS. 10-11, but such that the outer damper face 177 is spaced apart from the platform undersurfaces 162U of the adjacent blades 162-1 to establish a clearance gap CG in a cold assembly state, as illustrated in FIGS. 7-8. The leading edge portion 173 of the respective damper seal 168 can be dimensioned to sit on the first shelves 165-1 of the adjacent blades 162-1 and the trailing edge portion 174 of the respective damper seal 168 can be dimensioned to sit on the second shelves 165-2 of the adjacent blades 162-1 to establish the clearance gap CG. The clearance gap CG can be dimensioned to facilitate positioning of the damper seal 168 in the neck pocket 162NP. The clearance gap CG can be less than a maximum thickness of the damper seal 168 between the outer damper face 177 and inner damper face 178. Pre-forming the damper seal 168 according to the predetermined geometry can reduce a break-in period of the damper seal 168 and assembly 170, thereby achieving relatively early damping effectiveness and reducing a duration of assembly and engine testing.

The inner damper face 178 can be concave across a width of the damper pocket 179 for substantially all positions along a length of the damper pocket 179 from the leading edge portion 173 to the trailing edge portion 174, as illustrated in FIGS. 8-9 (see also FIG. 6B). The geometry of the damper pocket 179 can serve to capture cooling flow conveyed by the neck cavity 166 for improved cooling augmentation to the damper seal 168. The geometry of the walls of the damper body 172 surrounding the damper pocket 179 can improve rigidity or stiffness of the damper seal 168, which can improve contact and sealing between the outer damper face 177 and platform undersurfaces 162U.

The damper seal 168 can have a relatively rigid or stiff construction to eliminate or otherwise limit creep and permanent deformation of the outer damper face 177 exceeding predetermined tolerances during engine operation. Deformation exceeding predetermined tolerances may cause reduced sealing and ingestion of hot gases from the gas path GP and through the intersegment gap IG. A thickness of the damper seal 168 can be substantially constant or can vary.

Referring to FIG. 8, a minimum width WARN is established between the first and second sidewalls 175, 176 in the second direction T. A minimum thickness $T_{MIN}$ at a position along the minimum width $W_{MIN}$ location of the damper seal 168 can be established between the outer damper face 177 and the inner damper face 178. An overall minimum width of the damper body 172 may be established at the minimum width $W_{MIN}$ location or at another position along the damper body 172. The damper seal 168 can be dimensioned according to a thickness ratio $T_{MIN}:W_{MIN}$, which is defined as the minimum thickness $T_{MIN}$ divided by the minimum width $W_{MIN}$ It should be understood that the dimensions of the damper seal 168 disclosed herein are measured prior to installing the damper seal 168 in the assembly 170 and prior to engine operation in the hot assembly state. The thickness ratio $T_{MIN}:W_{MIN}$ can be greater than or equal to 0.10, or more narrowly greater than or equal to 0.20. Dimensioning the damper seal 168 according to the thickness ratios $T_{MIN}:W_{MIN}$ disclosed herein can improve sealing and reduce material and weight of the damper seal 168.

Referring to FIG. 9, the damper pocket 179 can be elongated to follow a length of the neck pockets 162NP of the adjacent airfoils 162. A minimum width $WP_{MIN}$ of the damper pocket 179 is established in the second direction E, such as the circumferential direction T. The minimum width $WP_{MIN}$ location can be established along the second region 179B of the damper pocket 179. A maximum length $LP_{MAX}$ of the damper pocket 179 is established in the first direction D, such as the axial direction X. The damper seal 168 can be dimensioned according to a width ratio $WP_{MIN}:LP_{MAX}$, which is defined as the minimum width $WP_{MIN}$ divided by the maximum length $LP_{MAX}$. The width ratio $WP_{MIN}:LP_{MAX}$ can be less than or equal to 0.25, or more narrowly less than or equal to 0.10.

The damper pocket 179 can be dimensioned to flair outwardly from the axial position of the minimum width $W_{MIN}$. A first width $W_1$ of the damper pocket 179 is established by the first region 179A across the leading edge portion 173 between forwardmost ends of the first and second sidewalls 175, 176. A second width W2 of the damper pocket 179 is established by the second region 179C across the trailing edge portion 174 between with the aftmost or rearmost ends of the first and second sidewalls 175, 176. The damper pocket 179 can be dimensioned such that the first width $W_1$ and/or second width $W_2$ are greater than the minimum width $W_{MIN}$ The first and second width $W_1$, $W_2$ can be the same or can differ from each other.

Circumferential edge faces of the first and/or second sidewalls 175, 176 can establish cutouts 172C in the damper body 172. The cutouts 172C can have a generally concave geometry between the leading and trailing edge portions 173, 174 (see also FIGS. 5 and 8). The cutouts 172C in the damper body 172 can reduce material and weight of the damper seal 168.

Referring to FIGS. 10-11, with continuing reference to FIGS. 7-9, the damper body 172' is moveable in the radial direction R (or third direction F) to establish contact and a sealing relationship between the platform undersurface 162U' and the outer damper face 177' in a hot assembly state. The platform undersurfaces 162U' of the adjacent blades 162-1' can establish a concavity across a width the neck cavity 166' at substantially all positions along a length of the neck cavity 166' in which the outer damper face 177' abuts against or contacts the platform undersurfaces 162U' in the hot assembly state. The damper seal 168' provides sealing of the intersegment gap IG', damping of vibration of the adjacent airfoils 162' and absorption of energy in response to contact between the platform undersurfaces 162U' and the outer damper face 177' during engine operation.

The outer damper face 177' can be dimensioned to have a substantially convex geometry at each position along the length of the damper body 172' in which the outer damper face 177' establishes contact with the platform undersurfaces 162U' such that the damper body 172' is rotatable about a damper axis DA' in the hot assembly state (see also FIG. 9). The damper body 172' can be rotatable tangentially relative to the engine axis A (FIG. 10) to accommodate a total tolerance stack of the assembled hardware. Rotation of the damper body 172' about the damper axis DA' can occur in response to relative radial movement between the mate faces 162M' of the adjacent blades 162-1' in the hot assembly state such that the platform undersurfaces 162U' are radially misaligned or mismatched to establish a step between the mate faces 162M'. The damper axis DA' can extend in the axial direction X.

The damper seal 168, including the damper body 172, can be formed utilizing various techniques and materials. Exemplary materials include metallic and/or non-metallic materials, such as any of the materials disclosed herein. The damper seal 168 can have a monolithic construction or can include two or more pieces that are fastened or otherwise secured together. In examples, the damper seal 168 is formed from sheet metal that is pre-formed according to the predetermined geometry. In other examples, the damper seal 168 is cast or machined from a metallic work piece according to the predetermined geometry.

Figure 12:
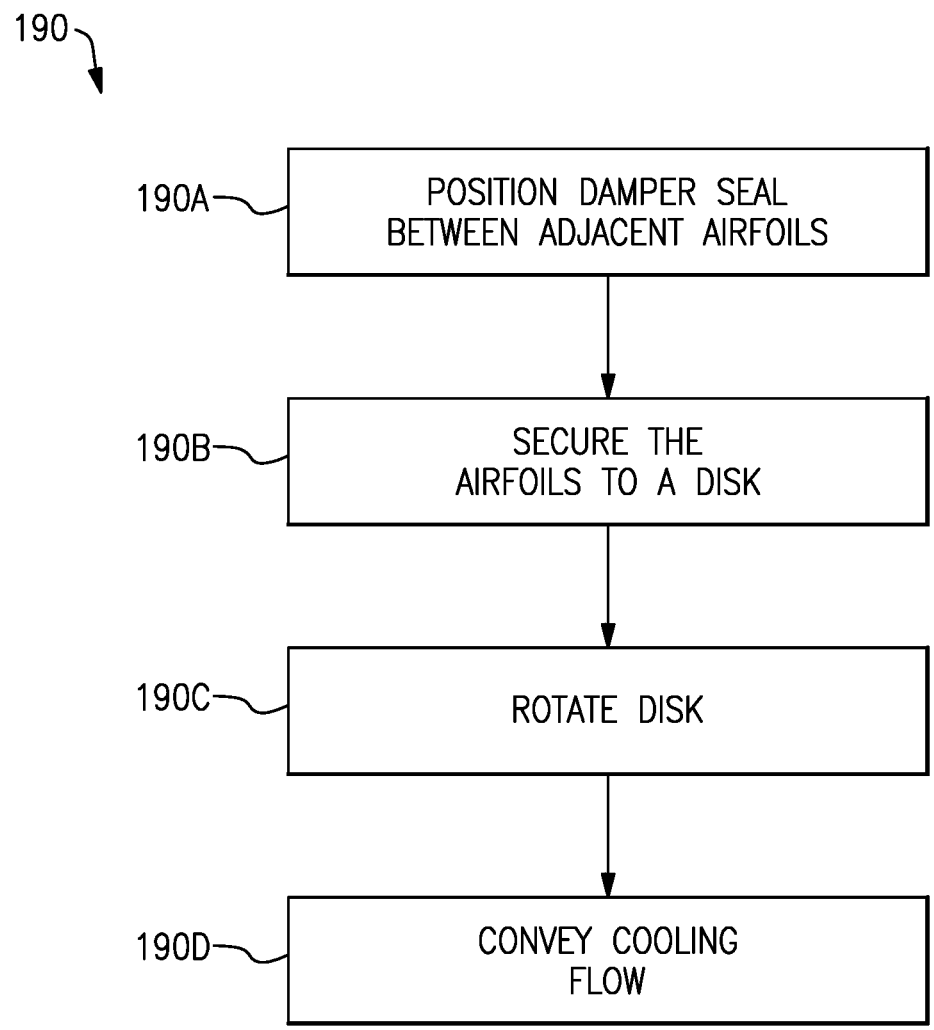
FIG. 12 illustrates a method of damping a component.

FIG. 12 illustrates an exemplary method of damping for a gas turbine engine in a flow chart 190. The method 190 can be utilized to dampen and/or seal against various gas turbine engine components, including any of the components disclosed herein. Reference is made to the assembly 170 for illustrative purposes.

Referring to FIGS. 7-9, with continuing reference to FIG. 12, at step 190A the damper seal 168 is positioned between adjacent components 160, such as between the adjacent airfoils 162. Step 190A can include moving the adjacent airfoils 162 in a direction DIR relative to each other to trap the damper seal 168 in opposed neck pockets 162NP of the adjacent airfoils 162 to establish a cold assembly state of the assembly 170, as illustrated in FIGS. 8-9. The direction DIR can be substantially parallel to the circumferential direction T of the assembly 170. The damper seal 168 can be dimensioned to circumferentially span across the intersegment gap IG in the cold assembly state.

The outer damper face 177 can be pre-formed according to a predetermined geometry that substantially corresponds to a predetermined geometry of the platform undersurfaces 162U. The outer damper face 177 can be pre-formed such that at least a majority or substantially all of the surfaces of the outer damper face 177 establish a sealing relationship with the platform undersurfaces 162U of the airfoils 162 that face or oppose the outer damper face 177 in a hot assembly state, as illustrated by the damper seal 168' in FIGS. 10-11, but such that the outer damper face 177 is spaced apart from the platform undersurfaces 162U in the cold assembly state, as illustrated in FIGS. 7-8. Moving the adjacent airfoils 162 can occur such that the leading edge portion 173 of the damper seal sits on the first shelves 165-1 of the adjacent airfoils 162 and the trailing edge portion 174 of the damper seal 168 sits on the second shelves 165-2 of the adjacent airfoils 162 in the cold assembly state.

At step 190B, the adjacent airfoils 162 can be mounted or otherwise secured to a rotatable disk, such as one of the disks 61D of FIG. 2. Each of the adjacent airfoils 162 can comprise a first material. The disk 61D can comprise a second material that can be the same or can differ from the first material. The first and second materials can differ by melting point or operating temperature capability.

Referring to FIGS. 10-11, with continuing reference to FIG. 12, in operation the damper seal 168' provides an amount of damping to the airfoils 162' during the hot assembly state in response to contact between the platform undersurfaces 162U' and the outer damper face 177' of the damper seal 168'. At step 190C, in operation the disk 61D (FIG. 2) can be rotated about the engine axis A to cause centrifugal loading of the damper seal 168'. The centrifugal loading causes the damper seal 168' to move outwardly in the radial direction R to establish contact between the outer damper face 177' and the platform undersurfaces 162U' to seal the intersegment gap IG'. Relative movement between the platforms 162B' and the damper seal 168' can occur during operation, which may be caused by mechanical loading and/or thermal growth of the airfoils 162', damper seal 168' and/or other portions of the engine. The geometry of the damper seal 168' can improve sealing effectiveness at various positions of the damper seal 168'.

At step 190D, cooling flow can be conveyed from a coolant source CS to the neck pockets 162NP' of the neck cavity 166'. The cooling flow can be utilized to pressurize the neck cavity 166' to limit leakage of the cooling flow through the intersegment gap IG' and provide cooling augmentation to the damper seal 168' and adjacent portions of the airfoils 162'.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A damper seal for a gas turbine engine comprising:
a damper body extending in a first direction between a leading edge portion and a trailing edge portion, extending in a second direction between first and second sidewalls, and extending in a third direction between a convex outer damper face and a concave inner damper face;
wherein the inner damper face establishes a damper pocket, the leading and trailing edge portions slope inwardly from opposite ends of the damper body to bound the damper pocket in the first direction, the first and second sidewalls extend from the leading edge portion to the trailing edge portion and slope inwardly from opposite sides of the damper body to bound the damper pocket in the second direction;
wherein the outer damper face is pre-formed according to a first predetermined geometry that substantially corresponds to a second predetermined geometry of a platform undersurface bounding a neck pocket of an airfoil;
wherein the leading and trailing edge portions are dimensioned to sit on respective shelves opposing the platform undersurface of the airfoil and the first and second sidewalls are dimensioned to span between the shelves in a cold assembly state; and a locating tab extending in the third direction from the trailing edge portion of the damper body, the locating tab dimensioned to abut one of the shelves to limit movement of the damper body in the second direction.

2. The damper seal as recited in claim 1, wherein the damper body is moveable in the third direction to establish a sealing relationship between the platform undersurface and the outer damper face in a hot assembly state.

3. The damper seal as recited in claim 1, wherein the inner damper face is concave across a width of the damper pocket for substantially all positions along a length of the damper pocket from the leading edge portion to the trailing edge portion.

4. The damper seal as recited in claim 1, wherein a minimum width is established between the first and second sidewalls in the second direction, a minimum thickness is established between the outer damper face and the inner damper face in the third direction at a position along the minimum width, a thickness ratio is defined as the minimum thickness divided by the minimum width, and the thickness ratio is greater than or equal to 0.10.

5. The damper seal as recited in claim 4, wherein:
a width ratio is defined as a minimum width of the damper pocket in the second direction divided by a maximum length of the damper pocket in the first direction, and the width ratio is less than or equal to 0.25; and
a first width of the damper pocket is established across the leading edge portion, a second width of the damper pocket is established across the trailing edge portion, and the first and second widths are greater than the minimum width.

6. The damper seal as recited in claim 1, wherein the airfoil is a turbine blade.

7. A damper seal for a gas turbine engine comprising:
a damper body extending in a first direction between a leading edge portion and a trailing edge portion, extending in a second direction between first and second sidewalls, and extending in a third direction between a convex outer damper face and a concave inner damper face;
wherein the inner damper face establishes a damper pocket, the leading and trailing edge portions slope inwardly from opposite ends of the damper body to bound the damper pocket in the first direction, the first and second sidewalls extend from the leading edge portion to the trailing edge portion and slope inwardly from opposite sides of the damper body to bound the damper pocket in the second direction;
wherein the outer damper face is pre-formed according to a first predetermined geometry that substantially corresponds to a second predetermined geometry of a platform undersurface bounding a neck pocket of an airfoil; and
wherein the outer damper face follows a ridge of the damper body in the first direction from the leading edge portion to the trailing edge portion, the ridge has a first peak and a second peak, the first peak is adjacent to the leading edge portion, the second peak is adjacent to the trailing edge portion, the outer damper face slopes inwardly from the first peak to the second peak such that the first peak is outward of the second peak relative to the third direction.

8. The damper seal as recited in claim 7, wherein:
a minimum width is established between the first and second sidewalls in the second direction, a minimum thickness is established between the outer damper face and the inner damper face in the third direction at a position along the minimum width, a thickness ratio is defined as the minimum thickness divided by the minimum width, and the thickness ratio is greater than or equal to 0.10.

9. The damper seal as recited in claim 8, wherein:
a width ratio is defined as a minimum width of the damper pocket in the second direction divided by a maximum length of the damper pocket in the first direction, and the width ratio is less than or equal to 0.25; and
a first width of the damper pocket is established across the leading edge portion, a second width of the damper pocket is established across the trailing edge portion, and the first and second widths are greater than the minimum width.

10. The damper seal as recited in claim 7, wherein the leading and trailing edge portions are dimensioned to sit on respective shelves opposing the platform undersurface of the airfoil and the first and second sidewalls are dimensioned to span between the shelves in a cold assembly state.

11. The damper seal as recited in claim 10, further comprising:
a locating tab extending in the third direction from the trailing edge portion of the damper body, the locating tab dimensioned to abut one of the shelves to limit movement of the damper body in the second direction.

12. The damper seal as recited in claim 7, wherein the airfoil is a turbine blade.

13. A gas turbine engine comprising:
an array of blades rotatable about an engine axis;
an array of vanes adjacent to the array of blades;
an array of blade outer air seals distributed about the array of blades to bound a gas path, wherein each of the blades comprises:
an airfoil section extending in a radial direction from a platform section, extending in a chordwise direction between leading and trailing edges, and extending in a circumferential direction between pressure and suction sides;
a neck section extending in the radial direction between the platform section and a root section, the root section mounted to a rotatable disk;
wherein the platform section extends in the circumferential direction between mate faces and extends in the radial direction between a platform undersurface and a gas path surface bounding the gas path, the platform undersurface is dimensioned according to a first predetermined geometry, and the mate faces of adjacent blades of the array of blades face each other to establish an intersegment gap; and
wherein the neck sections of the adjacent blades oppose each other in the circumferential direction to establish a neck cavity bounded in the radial direction by the platform undersurfaces of the adjacent blades;
an array of damper seals that span across the respective intersegment gaps, each of the damper seals including a damper body having an outer damper face and an inner damper face establishing an elongated damper pocket;
wherein the outer damper face is pre-formed according to a second predetermined geometry that substantially corresponds to the first predetermined geometry of the adjacent blades such that at least a majority of the surfaces of the outer damper face establish contact with the platform undersurfaces of the adjacent blades in a hot assembly state, but is spaced apart from the platform undersurfaces of the adjacent blades to establish a clearance gap in a cold assembly state; and wherein first and second sidewalls of the damper body follow a length of the damper body from the leading edge portion to the trailing edge portion, the inner damper face is dimensioned to surround the damper pocket in the axial and circumferential directions, a width ratio is defined as a minimum width of the damper pocket in the circumferential direction divided by a maximum length of the damper pocket in the axial direction, and the width ratio is less than or equal to 0.25, a first width of the damper pocket is established across the leading edge portion, a second width of the damper pocket is established across the trailing edge portion, and the first and second widths are greater than the minimum width.

14. The gas turbine engine as recited in claim 13, wherein each of the blades includes first and second shelves that extend in the circumferential direction from the neck section to establish a neck pocket of the neck cavity, the neck pocket extends in the radial direction between the platform undersurface and the first and second shelves, and a leading edge portion of the respective damper seal sits on the first shelves of the adjacent blades and a trailing edge portion of the respective damper seal sits on the second shelves of the adjacent blades to establish the clearance gap.

15. The gas turbine engine as recited in claim 14, wherein each of the dampers includes a locating tab extending in the radial direction from one of the leading and trailing edge portions, and the locating tab is trapped between opposed sidewalls of the second shelves of the adjacent blades.

16. The gas turbine engine as recited in claim 13, wherein the damper body is rotatable about an axis extending in the axial direction in response to relative radial movement between the mate faces of the adjacent blades in the hot assembly state.

17. The gas turbine engine as recited in claim 13, wherein:
the first and second sidewalls are dimensioned to follow a contour of the respective neck sections of the adjacent blades; and
a minimum width is established between the first and second sidewalls of the damper body in the circumferential direction, a minimum thickness is established between the outer damper face and the inner damper face in the radial direction at a position along the minimum width, a thickness ratio is defined as the minimum thickness divided by the minimum width, and the thickness ratio is greater than or equal to 0.10.

18. The gas turbine engine as recited in claim 17, wherein the platform undersurfaces of the adjacent blades establish a concavity across a width the neck cavity at substantially all positions along a length of the neck cavity in which the outer damper face abuts against the platform undersurfaces in the hot assembly state.

19. A method of damping for a gas turbine engine comprising:
moving adjacent airfoils in a circumferential direction relative to each other to trap a damper seal in opposed neck pockets of the adjacent airfoils to establish a cold assembly state;
wherein the adjacent airfoils include respective platform sections, opposed mate faces of the platform sections establish an intersegment gap, and the damper seal circumferentially spans across the intersegment gap in the cold assembly state;
wherein platform undersurfaces of the platform sections bound the respective neck pockets in the radial direction, and the platform undersurfaces are dimensioned according to a first predetermined geometry; and
wherein the damper seal includes a damper body having an outer damper face and an inner damper face establishing a concave damper pocket, and the outer damper face is pre-formed according to a second predetermined geometry substantially corresponding to the first predetermined geometry such that at least a majority of the surfaces outer damper face establish a sealing relationship with the platform undersurfaces of the adjacent airfoils in a hot assembly state, but the outer damper face is spaced apart from the platform undersurfaces in a cold assembly state;
wherein each of the adjacent airfoils includes first and second shelves that extend in the circumferential direction to bound the respective neck pockets in the radial direction, and the step of moving the adjacent airfoils occurs such that a leading edge portion of the damper seal sits on the first shelves of the adjacent airfoils and a trailing edge portion of the damper seal sits on the second shelves of the adjacent airfoils in the cold assembly state; and
wherein the damper seal includes a locating tab extending in the radial direction from the trailing edge portion of the damper body, and the locating tab is dimensioned to abut one of the shelves to limit movement of the damper body in the circumferential direction.

20. The method as recited in claim 19, further comprising:
securing the adjacent airfoils to a rotatable disk, wherein each of the adjacent airfoils comprises a first material, and the disk comprises a second material that differs from the first material;
rotating the disk to establish contact between the outer damper face and the platform undersurfaces to seal the intersegment gap;
conveying cooling flow from a coolant source to the neck pockets.

* * * * *